United States Patent
Jeon

(10) Patent No.: US 11,960,424 B2
(45) Date of Patent: Apr. 16, 2024

(54) PERIPHERAL COMPONENT INTERCONNECT EXPRESS (PCIE) INTERFACE DEVICE AND METHOD OF OPERATING THE SAME

(71) Applicant: SK hynix Inc., Icheon-si (KR)

(72) Inventor: Yong Tae Jeon, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 0 days.

(21) Appl. No.: 17/522,843

(22) Filed: Nov. 9, 2021

(65) Prior Publication Data

US 2022/0327073 A1     Oct. 13, 2022

(30) Foreign Application Priority Data

Apr. 13, 2021 (KR) .......................... 10-2021-0048084

(51) Int. Cl.
    *G06F 13/28*     (2006.01)
    *G06F 13/42*     (2006.01)

(52) U.S. Cl.
    CPC .......... *G06F 13/28* (2013.01); *G06F 13/4221* (2013.01); *G06F 2213/0026* (2013.01)

(58) Field of Classification Search
    CPC ....................................................... G06F 13/28
    USPC ....................................................... 710/308
    See application file for complete search history.

(56) References Cited

U.S. PATENT DOCUMENTS

| | | | |
|---|---|---|---|
| 7,370,132 B1 * | 5/2008 | Huang ................ | G06F 13/4018 710/305 |
| 9,146,892 B2 | 9/2015 | Lindsay | |
| 9,183,171 B2 | 11/2015 | Iyer et al. | |
| 9,454,213 B2 | 9/2016 | Bharadwaj et al. | |
| 9,467,120 B1 * | 10/2016 | Song ..................... | G06F 1/3253 |

(Continued)

FOREIGN PATENT DOCUMENTS

| | | | |
|---|---|---|---|
| CN | 111124975 A | 5/2020 | |
| KR | 100807443 B1 | 2/2008 | |

(Continued)

OTHER PUBLICATIONS

Horner, R. "Using PCI Express L1 Sub-States to Minimize Power Consumption in Advanced Process Nodes." Semiconductor Engineering. Jul. 10, 2014. Cited in U.S. Appl. No. 17/522,827 Non-Final Office Action dated Jan. 25, 2023. <https://semiengineering.com/using-pci-express-l1-sub-states-to-minimize-power-consumption-in-advanced-process-nodes>.

(Continued)

*Primary Examiner* — Titus Wong
(74) *Attorney, Agent, or Firm* — Perkins Coie LLP

(57) ABSTRACT

A device may include a lane group, a command queue, and a link manager. The lane group may include a first lane and at least one or more second lanes to form a link for communicating with a host. The command queue may store commands for at least one direct memory access (DMA) device, the commands generated based on a request of the host. The link manager may, in response to detecting an event that an amount of the commands stored in the command queue being less than or equal to a reference value, change an operation mode from a first power mode to a second power mode in which power consumption is less than that of the first power mode, deactivate the at least one or more second lanes, and provide a second operation clock lower than a first operation clock to the at least one DMA device.

25 Claims, 9 Drawing Sheets

(56) References Cited

U.S. PATENT DOCUMENTS

| | | | |
|---|---|---|---|
| 9,760,311 B1* | 9/2017 | Amir | G06F 3/0653 |
| 10,152,280 B2 | 12/2018 | Ishiguro et al. | |
| 10,963,035 B2 | 3/2021 | Mishra | |
| 11,307,638 B2 | 4/2022 | Li | |
| 2007/0047667 A1* | 3/2007 | Shumarayev | H04L 25/14 |
| | | | 375/295 |
| 2007/0050653 A1 | 3/2007 | Verdun | |
| 2008/0288798 A1 | 11/2008 | Cooper | |
| 2009/0103444 A1 | 4/2009 | Khatri et al. | |
| 2009/0187683 A1* | 7/2009 | Adar | H04L 47/2416 |
| | | | 710/58 |
| 2010/0115174 A1* | 5/2010 | Akyol | G06F 13/385 |
| | | | 710/316 |
| 2011/0173352 A1* | 7/2011 | Sela | G06F 1/3253 |
| | | | 710/16 |
| 2012/0221882 A1* | 8/2012 | Morrison | H04L 25/14 |
| | | | 713/500 |
| 2013/0080660 A1* | 3/2013 | Lee | G06F 13/126 |
| | | | 710/5 |
| 2013/0173837 A1 | 7/2013 | Glaser et al. | |
| 2014/0019654 A1* | 1/2014 | Trivedi | G06F 13/42 |
| | | | 710/107 |
| 2014/0032939 A1* | 1/2014 | Jeddeloh | G06F 1/329 |
| | | | 713/300 |
| 2014/0108840 A1 | 4/2014 | Imao | |
| 2014/0195833 A1 | 7/2014 | Wang | |
| 2014/0372777 A1* | 12/2014 | Reller | G06F 13/161 |
| | | | 710/305 |
| 2015/0081955 A1 | 3/2015 | Vucinic et al. | |
| 2015/0205539 A1* | 7/2015 | Moon | G06F 3/0679 |
| | | | 711/103 |
| 2016/0109925 A1 | 4/2016 | Diefenbaugh | |
| 2016/0188510 A1 | 6/2016 | Singh et al. | |
| 2016/0210062 A1* | 7/2016 | McCambridge | G06F 3/0688 |
| 2016/0216758 A1 | 7/2016 | Kachare | |
| 2017/0083252 A1* | 3/2017 | Singh | G06F 3/0604 |
| 2017/0269675 A1 | 9/2017 | Klacar et al. | |
| 2017/0293451 A1 | 10/2017 | Pan et al. | |
| 2017/0300263 A1* | 10/2017 | Helmick | G06F 3/0679 |
| 2019/0042510 A1 | 2/2019 | Ngau | |
| 2019/0064915 A1 | 2/2019 | Leucht-Roth et al. | |
| 2019/0250930 A1 | 8/2019 | Erez | |
| 2019/0324659 A1 | 10/2019 | Benisty | |
| 2019/0340146 A1 | 11/2019 | Chen | |
| 2019/0391936 A1 | 12/2019 | Stalley | |
| 2020/0125157 A1 | 4/2020 | Kachare | |
| 2020/0226091 A1 | 7/2020 | Harriman | |
| 2020/0310517 A1 | 10/2020 | Li | |
| 2020/0371578 A1 | 11/2020 | Murali | |
| 2020/0371579 A1 | 11/2020 | Selvam | |
| 2021/0055866 A1 | 2/2021 | Fujimoto | |
| 2022/0011965 A1 | 1/2022 | Heller | |
| 2022/0197519 A1 | 6/2022 | Kuo | |
| 2022/0326885 A1 | 10/2022 | Jeon et al. | |
| 2022/0327074 A1 | 10/2022 | Jeon et al. | |

FOREIGN PATENT DOCUMENTS

| | | |
|---|---|---|
| KR | 20100109446 A | 10/2010 |
| KR | 1020140113439 A | 9/2014 |
| KR | 1020160105209 A | 9/2016 |
| KR | 1020170124017 A | 11/2017 |
| KR | 20180049192 A | 5/2018 |
| KR | 20180121531 A | 11/2018 |
| WO | 2020155005 A1 | 8/2020 |

OTHER PUBLICATIONS

"PCI Express Base Specification." Revision 4.0, Version 0.3, Feb. 19, 2014, 53 pages.

* cited by examiner

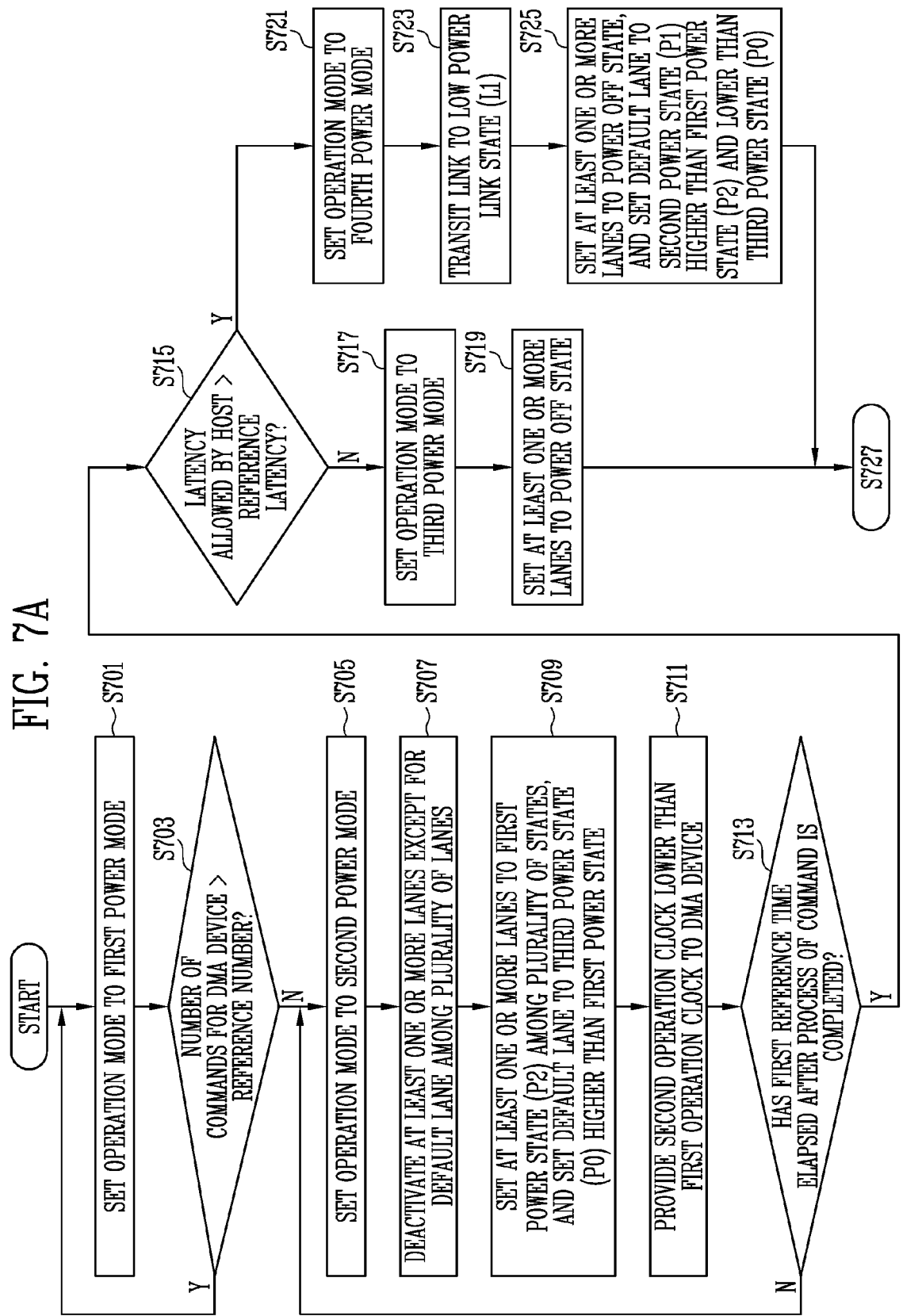

PERIPHERAL COMPONENT INTERCONNECT EXPRESS (PCIE) INTERFACE DEVICE AND METHOD OF OPERATING THE SAME

CROSS-REFERENCE TO RELATED APPLICATION

This patent document claims priority to and benefits of the Korean patent application number 10-2021-0048084, filed Apr. 13, 2021, which is incorporated herein by reference in its entirety.

TECHNICAL FIELD

The technology and implementations disclosed in this patent document relate to an electronic device, and more particularly, to a PCIe interface device and a method of operating the same.

BACKGROUND

A peripheral component interconnect express (PCIe) is a serial interface for data communication. A PCIe-based storage device supports multi-ports and multi-functions. The PCIe-based storage device may be virtualized and non-virtualized, and achieve quality of service (QoS) of a host I/O command through one or more PCIe functions.

Storage devices refer to electronic components that are used to store data based on control of a host device such as a computer or a smartphone. A storage device may include a memory device to store data and a memory controller configured to control the memory device. The memory device is divided into a volatile memory device and a non-volatile memory device.

A volatile memory device is a device that can retain its data only when power is supplied. Thus, such a volatile memory device loses its data in the absence of power. Examples of the volatile memory device includes a static random access memory (SRAM) and a dynamic random access memory (DRAM).

A non-volatile memory device is a device that can retain its data even in the absence of power. Examples of the non-volatile memory device includes a read only memory (ROM), a programmable ROM (PROM), an electrically programmable ROM (EPROM), an electrically erasable and programmable ROM (EEPROM), and a flash memory.

SUMMARY

Various embodiments of the disclosed technology relate to a PCIe interface device having improved power management performance, and a method of operating the same.

In some embodiments of the disclosed technology, a device may include a lane group, a command queue, and a link manager. The lane group may include a first lane and at least one or more second lanes to provide communications, each lane being configured to form a link for communicating with a host. The command queue may store commands for at least one direct memory access (DMA) device, the commands generated based on a request of the host. The link manager may, in response to detecting an event that an amount of the commands stored in the command queue being less than or equal to a reference value, change an operation mode from a first power mode to a second power mode in which power consumption is less than that of the first power mode, deactivate the at least one or more second lanes, and provide a second operation clock lower than a first operation clock to the at least one DMA device.

In some embodiments of the disclosed technology, a method of operating a peripheral component interconnect express (PCIe) interface device may comprise changing an operation mode from a first power mode to a second power mode in which power consumption is less than that of the first power mode in response to a first event that an amount of commands for at least one direct memory access (DMA) device generated based on a request of a host in communication with the PCIe interface through a link is less than or equal to a reference value, deactivating at least one or more lanes included in the PCIe interface device and providing a second operation clock lower than a first operation clock to the at least one DMA device.

In some embodiments of the disclosed technology, a peripheral component interconnect express (PCIe) interface device may include a lane group, a command queue, and a link manager. The lane group may include a default lane and at least one or more lanes, forming a link for communicating with a host. The command queue may store commands for at least one direct memory access (DMA) device generated based on a request of the host. The link manager may change an operation mode from a first power mode among a plurality of power modes to a second power mode in which power consumption is less than that of the first power mode, deactivate the at least one or more lanes, and provide a second operation clock lower than a first operation clock to the at least one DMA device, when an amount of the command stored in the command queue is less than or equal to a reference value.

In some embodiments of the disclosed technology, a method of operating a peripheral component interconnect express (PCIe) interface device including a default lane and at least one or more lanes, forming a link for communicating with a host may include changing an operation mode from a first power mode among a plurality of power modes to a second power mode in which power consumption is less than that of the first power mode, when an amount of commands for at least one direct memory access (DMA) device generated based on a request of the host is less than or equal to a reference value, deactivating the at least one or more lanes, and providing a second operation clock lower than a first operation clock to the at least one DMA device.

In some embodiments of the disclosed technology, a PCIe interface device having improved power management performance, and a method of operating the same are provided.

BRIEF DESCRIPTION OF THE DRAWINGS

FIGS. 7A and 7B are flowcharts illustrating an operation of a PCIe interface device based on an embodiment of the disclosed technology.

DETAILED DESCRIPTION

Specific structural or functional descriptions of embodiments are illustrated as examples of the disclosed technology. The embodiments of the disclosed technology may be carried out in various forms.

Figure 1:
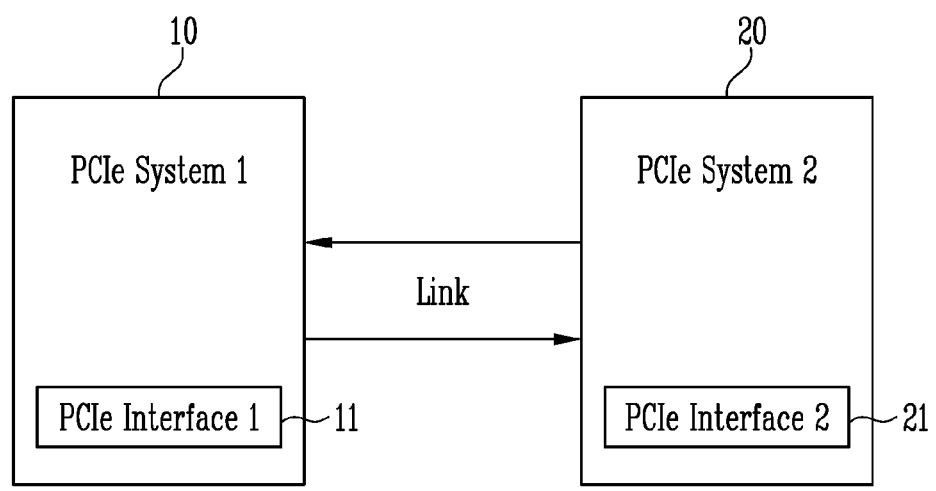
FIG. 1 is a diagram illustrating a PCIe system based on an embodiment of the disclosed technology.

FIG. 1 is a diagram illustrating a PCIe system based on an embodiment of the disclosed technology.

Referring to FIG. 1, a first PCIe system 10 may include a first PCIe interface device (PCIe Interface 1) 11. A second PCIe system 20 may include a second PCIe interface device (PCIe Interface 2) 21.

The first PCIe system 10 and the second PCIe system 20 may be an electronic device supporting communication using a PCIe protocol. For example, the first PCIe system 10 may be a PC, a laptop computer, or a mobile computing device. In addition, the second PCIe system 20 may include an expansion card, an expansion board, an adapter card, an add-in card, or an accessory card. The second PCIe system 20 may include a printed circuit board (PCB) that may be inserted into an electrical connector or an expansion slot on a motherboard of the first PCIe system 10 in order to provide an additional function to the first PCIe system 10 through an expansion bus. The second PCIe system 20 may include a storage device such as a solid state drive (SSD), a graphic card, a network card, or a USB card. In another embodiment, the first PCIe system 10 and the second PCIe system 20 may be reversely configured.

The first PCIe system 10 and the second PCIe system 20 may perform communication using the first PCIe interface device 11 and the second PCIe interface device 21, respectively. The first PCIe system 10 and the second PCIe system 20 may form a link and communicate through the formed link. The first PCIe system 10 and the second PCIe system 20 may transmit and receive a data packet with each other through the link.

Figure 2:
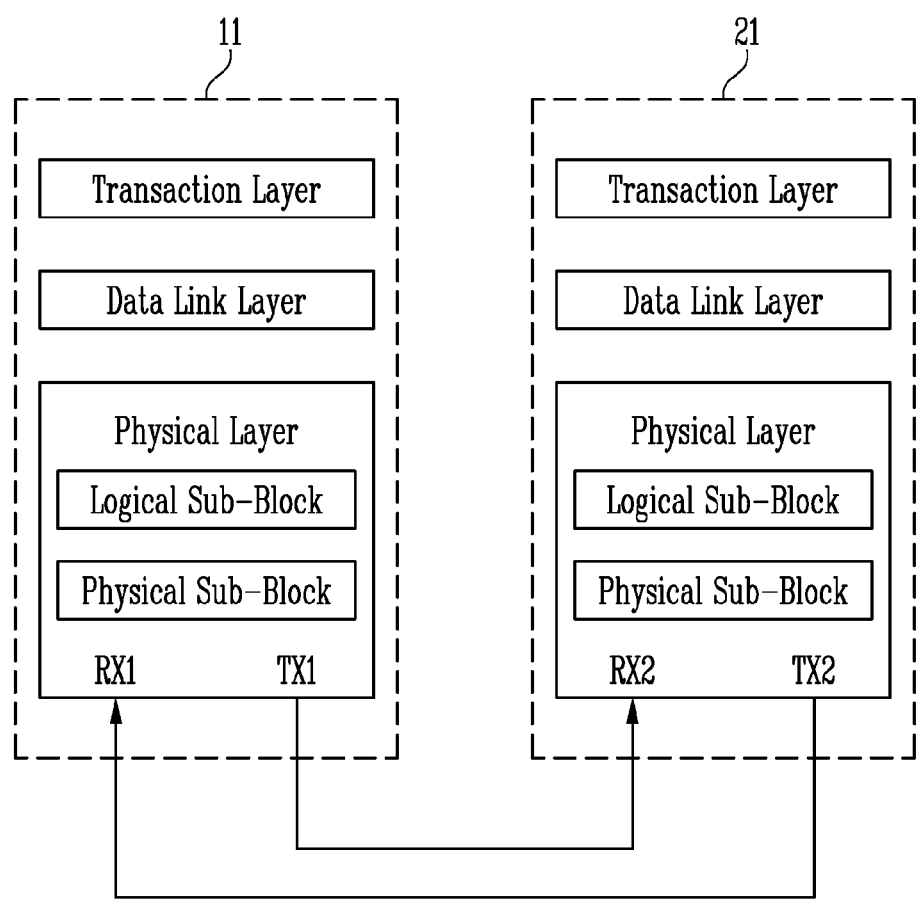
FIG. 2 is a diagram illustrating layers included in a PCIe interface device described with reference to FIG. 1.

FIG. 2 is a diagram illustrating layers included in the PCIe interface device described with reference to FIG. 1.

Referring to FIGS. 1 and 2, each of the PCI interface devices 11 and 21 may include a transaction layer, a data link layer, and a physical layer. The physical layer may include a logical sub block and a physical sub block.

The transaction layer may combine or disassemble a transaction layer packet (TLP). Here, the TLP may be used to process a transaction of read and write, that is, a specific event.

The transaction layer may control a credit-based flow. In addition, the transaction layer may support addressing of various formats according to a transaction type. For example, the transaction layer may support addressing for a memory, input/output, a configuration, or a message.

The transaction layer may perform initialization and configuration functions. Specifically, the transaction layer may store link setting information generated by a processor or a management device. In addition, the transaction layer may store a link property related to a bandwidth and a frequency determined in the physical layer.

The transaction layer may generate and process a packet. Specifically, the TLP requested from a device core may be generate and the received TLP may be converted into data payload or state information. In addition, when the transaction layer supports end-to-end data integrity, transaction layer may generate a cyclic redundancy code (CRC) and update the CRC to a header of the TLP.

The transaction layer may perform flow control. Specifically, the transaction layer may track a flow control credit for the TLP in the link. In addition, the transaction layer may periodically receive a transaction credit state through the data link layer. The transaction layer may control TLP transmission based on flow control information.

The transaction layer may manage power. Specifically, the transaction layer may manage power according to an instruction of a system software. In addition, the transaction layer may perform autonomous power management according to an instruction of hardware in a state in which the power is turned on.

The transaction layer may identify a virtual channel mechanism and a traffic class for a specific class of an application. The transaction layer may provide an independent logical data flow through a specific physical resource. In addition, the transaction layer may apply an appropriate service policy in a method of providing different ordering through packet labeling.

The data link layer may be responsible for link management, data integrity, error detection, and error correction. The data link layer may transmit the TLP, which is to be transmitted, to the physical layer, by assigning a data protection code and a TLP sequence number. In addition, the data link layer may check the integrity of the TLP received from the physical layer and transmit the TLP to the transaction layer.

When the data link layer detects an error of the TLP, the data link layer may receive a TLP in which an error does not exist or request the physical layer to retransmit the TLP until it is determined that the link is in a fail state. The data link layer may generate and consume a data link layer packet (DLLP) used for the link management.

The data link layer may exchange reliable information. In addition, the data link layer may manage initialization and power. Specifically, the data link layer may transmit a power state request of the transaction layer to the physical layer. In addition, the data link layer may transmit information on activation-or-not, reset, connection release, and power management state to the transaction layer.

The data link layer may perform data protection, error checking, and retry. Specifically, the data link layer may generate the CRC for data protection. In addition, the data link layer may store the TLP to enable retry on the transmitted TLP. The data link layer may check the TLP, transmit a retry message, report an error, and display an error for logging.

The physical layer may include a driver, an input buffer, a parallel-to-serial or serial-to-parallel converter, and a configuration for an interface operation such as a phase locked loop (PLL).

The physical layer may convert a packet received from the data link layer into a serialized format and transmit the packet. In addition, the physical layer may set the bandwidth and frequency according to compatibility with a device connected to another side of the link. In order to communicate data serially, the physical layer may convert the packet from parallel to serial and from serial to parallel again. That is, the physical layer may perform a function of a serializer or deserializer.

The physical layer may perform interface initialization, maintenance and state tracking. Specifically, the physical layer may manage power by connection between components. In addition, the physical layer may negotiate a bandwidth and lane mapping between the components and reverse a polarity of a lane.

The physical layer may generate a symbol and a special ordered set. In addition, the physical layer may transmit and align the generated symbol.

The physical layer may serve as a packet transmitter or receiver between PCI components. The physical layer may convert the packet received through the transaction layer and the data link layer and transmit the packet to another PCI component, and convert the packet received from another PCI component and transmit the packet to the transaction layer through the data link layer.

The logical sub block included in the physical layer may be configured of two sections. One of the two sections may be a transmission section for preparing of a transmission, to the physical sub layer, of information that has been transmitted from the data link layer. The other of the two sections may be a receiving section for identifying information and preparing an output of the information to the data link layer. Thus, the receiving section identifies information and outputs the identified information to the data link layer.

The physical sub block included in the physical layer may be an electrical sub block, and may support a commonly or individually independent reference clock structure. In addition, the physical sub block may reduce swing for a low power link operation, detect a receiver in a band, and detect an electrical idle state.

Figure 3:
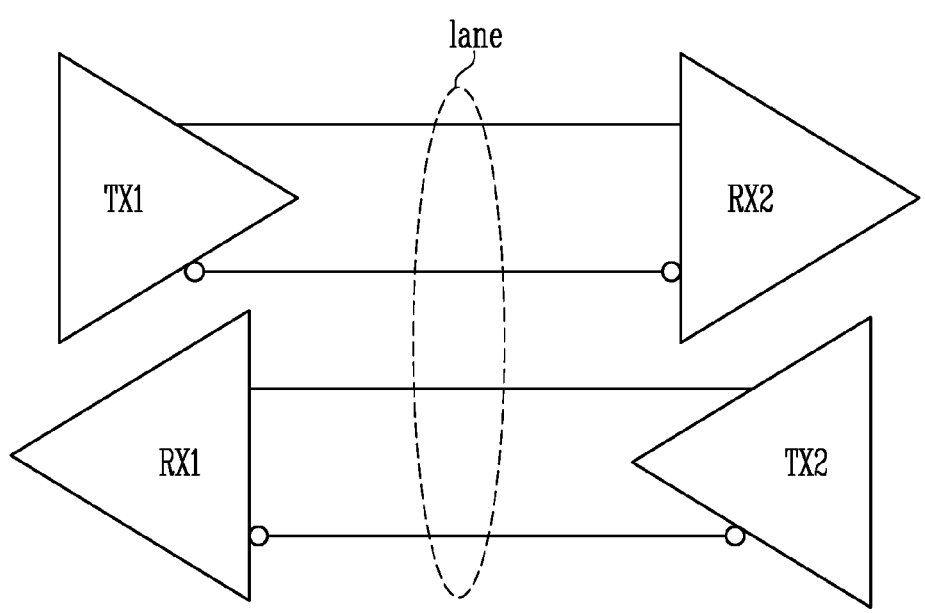
FIG. 3 is a diagram illustrating a lane based on an embodiment of the disclosed technology.

FIG. 3 is a diagram illustrating a lane according to an embodiment of the disclosed technology.

Referring to FIG. 3, a first transmitter TX1, a second transmitter TX2, a first receiver RX1, and a second receiver RX2 are shown to be on two sides of the lane: the first side includes the first transmitter TX1 and the first receiver RX1, and a second side includes the second transmitter TX2 and second receiver RX2. This lane provides communications between the two sides in two opposite directions: from TX1 to RX2 in one direction and from TX2 to RX1 in the opposite direction. The lane may include a path including differentially driven signal pairs, for example, a transmission path pair configured for transmission and a reception path pair configured for reception. The PCIe system may include a transmission logic that transmits data to another PCIe system, and a reception logic that receives data from another PCIe system. For example, the PCIe system may include two transmission paths connected to the first transmitter TX1 and two reception paths connected to the first receiver RX1.

The transmission path may be used for transmitting data and configured to include a transmission line, a copper line, an optical line, a wireless communication channel, an infrared communication link, or any other communication path. The reception path may be used for receiving data and configured to include a reception line, a copper line, an optical line, a wireless communication channel, an infrared communication link, or any other communication paths.

A connection between the first PCIe system 10 and the second PCIe system 20 described with reference to FIG. 1 may be referred to as a link. The link may support at least one lane. In some implementations, each lane may indicate a set of differential signal pairs (one pair for transmission and the other pair for reception). The link may include a plurality of lanes to adjust the bandwidth. For example, the link may include 1, 2, 4, 8, 12, 16, 32, 64, or others.

Figure 4A:
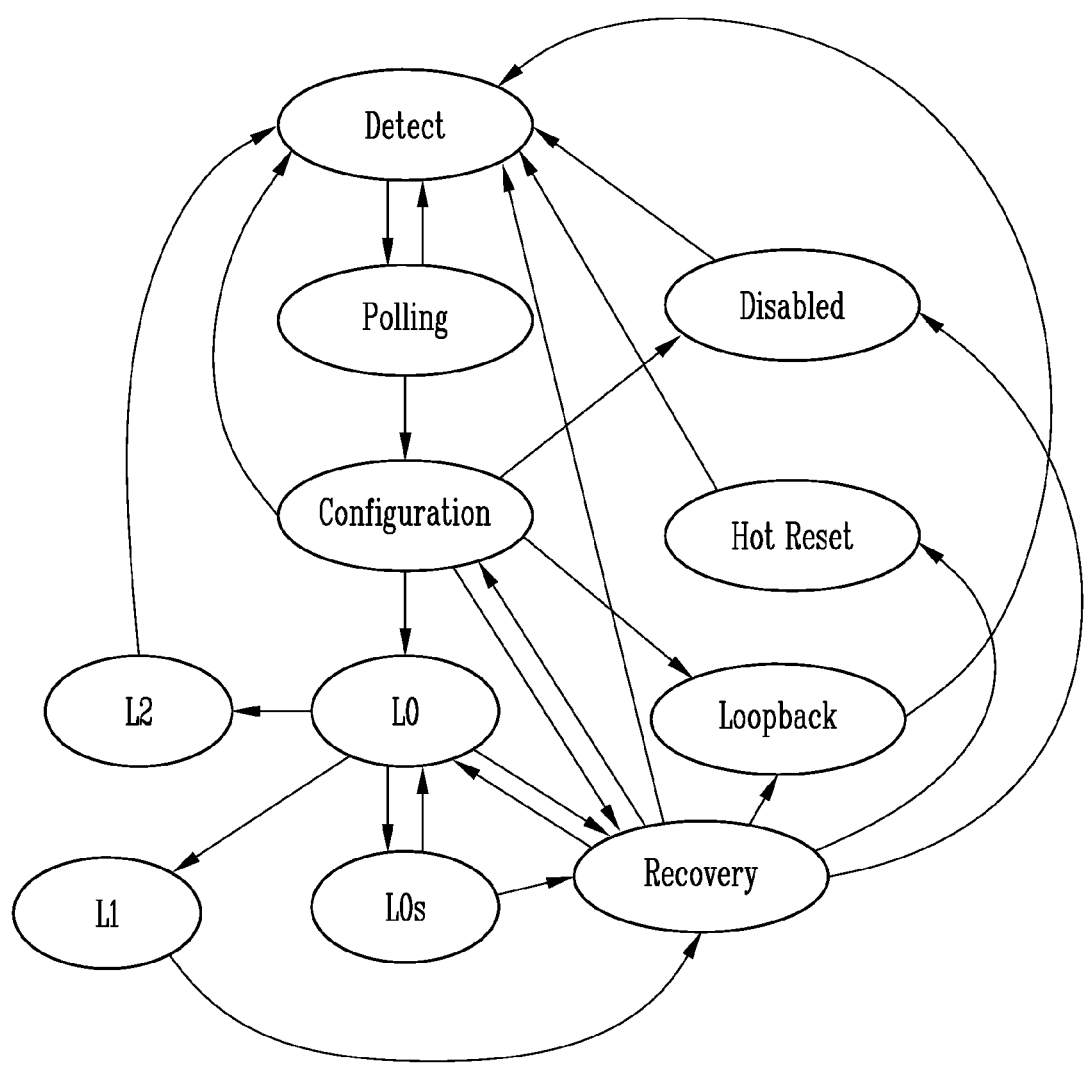
FIG. 4A is a diagram illustrating a link training & status state machine (LTSSM) in relation to a link described with reference to FIG. 1.

FIG. 4A is a diagram illustrating a link training & status state machine (LTSSM) in relation to the link described with reference to FIG. 1.

A detect state may be a state in which the link connected between the PCIe components is detected. In the detect state, a physically connected lane is searched for.

The detect state may be an initial state of the LTSSM, and may be a state that is entered after reset or when booting. In addition, the detect state may reset all logic, ports and registers. The detect state may be entered when instructed from the host. The LTSSM may proceed from the detect state to a polling state.

In an embodiment, the polling state may be a state in which a lane capable of data communication is distinguished from among detected lanes. That is, the polling state may be a state in which clocks between the PCIe components are synchronized, a polarity of the lane is checked (whether it is D+ or D−), and a data transmission speed that the lane may use is checked. Furthermore, the polling state may be a state in which a boundary between consecutive bits in data is checked. In an embodiment, the LTSSM may proceed from the polling state to a configuration state.

In an embodiment, the configuration state may be a state in which a connection state of the lane is checked. For example, the configuration state may be a state in which a lane width in which data communication is possible is determined. In addition, in the configuration state, a bit indicated as PAD of Training Sequences is changed to the negotiated number, and negotiation for maximum performance between both components may be performed. In the configuration state, both of the transmitter and the receiver may transmit or receive data at negotiated data transmission/reception speed. In addition, in the configuration state, lane to lane de-skew, in which parallel bit streams reach at different devices at different times from a plurality of lanes.

In an embodiment, the LTSSM may proceed from the configuration state to the detect state, an L0 state, a recovery state, a loopback state, or a disabled state.

In an embodiment, the L0 state may be a state in which data and a control packet are normally transmitted and received. In the L0 state, a transaction layer packet (TLP) and a data link layer packet (DLLP) may be transmitted and received. In addition, all power management states may be started from the L0 state.

In an embodiment, the LTSSM may proceed from the L0 state to an L1 state, an L2 state, an L0s state, or the recovery state.

In an embodiment, each of the L0s state, the L1 state, and the L2 state may correspond to a low power state.

In some implementation, the L0s state may be a sub state of the L0 state, and in the L0s state, the link may quickly proceed to the low power state and recover without passing through the recovery state. In addition, in order to proceed from the L0s state to the L0 state, bit lock, symbol lock, and lane to lane de-skew may be reset. At this time, the transmitter and the receiver of both components are required to in the L0s state simultaneously. The LTSSM may proceed from the L0s state to the L0 state or the recovery state.

A return speed of the L1 state to return to the L0 state is slower than that of the L0s state, but the L1 state allows additional power saving more than the L0 state through an additional resumption latency in the L1 state. The L1 state may be entered through active state power management (ASPM) or power management software. At this time, the ASPM may be a policy to change the link to a low power state when a device connected to the PCIe is not used, and the power management software may be a policy to change the device connected to the PCIe to the low power state.

In addition, the entry into the L1 state may proceed after receiving an electrical idle ordered set (EIOS) according to an instruction received from the data link layer. The LTSSM may proceed from the L1 state to the recovery state.

In the L2 state, maximum power is conserved, and the transmitter and the receiver of the device connected to the PCIe may be shut off. In the L2 state, power and clock may not be guaranteed, but AUX power may be used. The entry into the L2 state may proceed after receiving the EIOS according to the instruction from the data link layer. The LTSSM may proceed from the L2 state to the detect state.

In an embodiment, the recovery state may be entered when an error occurs in the L0 state, and transit to the L0 state again after the error recovery. In some implementations, the recovery state may enter upon returning from the L1 state to the L0 state. In some implementations, the recovery state may correspond to a transition state when entering the loopback state, a hot reset state, or a disabled state.

In the recovery state, bit lock, symbol lock, or block alignment and lane to lane de-skew may be reset. In addition, in the recovery state, a data transmission speed of the lane may be changed.

In an embodiment, the LTSSM may proceed from the recovery state to the L0 state, the configuration state, the detect state, the loopback state, the hot reset state, or the disabled state.

In an embodiment, the loopback state may proceed for a test, and may be entered when measuring a bit error rate. The loopback may be a state in which bit 2 is used in a training control field of training sequences (ex. TS1 and TS2), and the receiver may retransmit all received packets. The LTSSM may proceed to the detect state after measuring the bit error rate in the loopback state.

In an embodiment, the hot reset state may be a state in which the link is reset, and may be a state in which bit 0 is used in the training control field of the training sequences (ex. TS1 and TS2). The LTSSM may proceed from the hot reset state to the detect state.

In an embodiment, the disabled state may be a state in which the transmitter is in an electrical idle state when the receiver is in a low impedance state. In the disabled state, the link may be deactivated until the electrical idle state ends. The disabled state may be a state in which bit 1 is used in the training control field of the training sequences (ex. TS1 and TS2). When an instruction from a higher state, the LTSSM may proceed to the disabled state. The LTSSM may proceed from the disabled state to the detect state.

A link up may indicate transition from the detect state to the L0 state through the polling state and the configuration state, and a link down may indicate transition to the detect state again. A link training may indicate a state in which the physical layer among the PCIe layers is in the configuration state or the recovery state.

In addition, the LTSSM may set a link up register value for each state. For example, a state in which the link up register is '1' may be a link up state, and a state in which the link up register is '0' may be a link down state. When the LTSSM initially proceeds to the L0 state, the link up register may be set to '1'.

Specifically, the link up register corresponding to the detect state, the polling state, the configuration state, the loopback state, the hot reset state, and the disabled state may be set to '0', and the link up register corresponding to the L0 state, the L0s state, the L1 state, and the L2 state may be set to '1'.

In an embodiment, during the link down, data may be flushed, and a PCIe register and an NVMe register may be reset. Therefore, the host is required to initialize the PCIe register and the NVMe register. In a case of the link down intended to the host, the host may initialize a PCIe register and an NVMe register.

In a case of a sudden link down that is not intended to the host, for example, in a case of failure of data transmission/reception speed change, failure of lane change, failure of low power end, or others, the LTSSM timeout may occur, and thus the LTSSM may transit to the detect state. At this time, since the sudden link down that is not intended to the host is the link down between two ports, an OS and an NVMe driver may not be aware of this. Therefore, the host may attempt to access a device without initializing the PCIe register and the NVMe register, which causes undesired occurrence such as a blue screen and/or a stop of a host operation due to reset values.

In an embodiment, the L0 state may be referred to as a normal link state in which a link operates normally as compared to the L1 state, the L2 state, L0s state. In some implementations, the L1 state may be referred to as a low power link state.

Figure 4B:
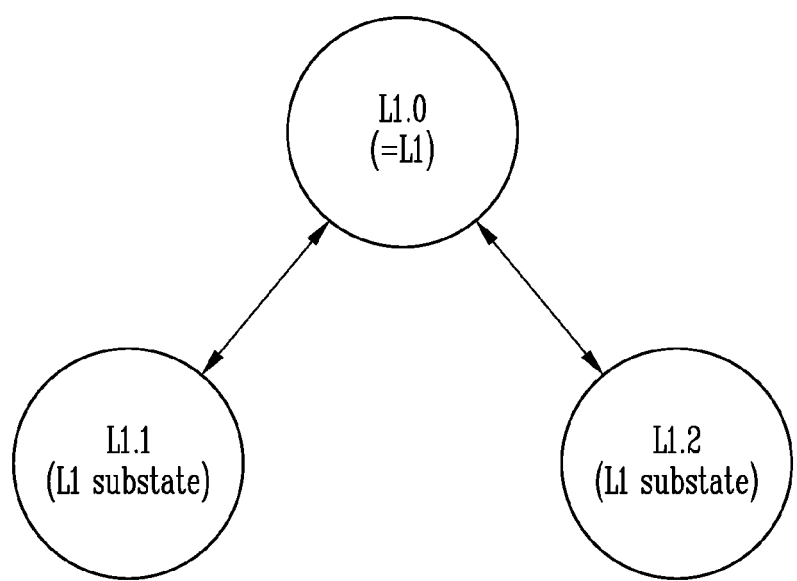
FIG. 4B is a diagram illustrating sub states of L1 described with reference to FIG. 4A.

FIG. 4B is a diagram illustrating sub states of L1 described with reference to FIG. 4A.

Referring to FIG. 4B, the sub state of L1 may include an L1.0 sub state, an L1.1 sub state, and an L1.2 sub state.

The L1.0 sub state may transit to the L1.1 sub state or the L1.2 sub state.

The L1.0 sub state may correspond to the L1 state described with reference to FIG. 3. In order to detect an electrical idle exit in the L1.0 sub state, an upstream port and a downstream port are required to be activated.

The L1.1 sub state may transit to the L1.0 sub state.

In the L1.1 sub state, link common mode voltages are required to be maintained. In order to enter into or exit from the L1.1 sub state, a bidirectional open-drain clock request (CLKREQ #) signal may be used. In order to detect the electrical idle exit in the L1.1 sub state, the upstream port and the downstream port are not required to be activated.

The L1.2 sub state may transit to the L1.0 sub state.

In the L1.2 sub state, the link common mode voltages are not required to be maintained. In order to enter into or exit from the L1.2 sub state, a bidirectional open-drain clock request (CLKREQ #) signal may be used. In order to detect the electrical idle exit in the L1.1 sub state, the upstream port and the downstream port are not required to be activated.

A reference clock may not be required for a port that supports the sub states (the L1.1 sub state and the L1.2 sub state) of L1 except for the L1.0 sub state. The open-drain clock request (CLKREQ #) signal may be used by a sub state protocol of L1, but a relationship with a local clock used in the port of the link may not be defined separately. The port supporting the L1.2 sub state is required to support latency tolerance reporting (LTR).

In an embodiment, the L1.1 sub state and the L1.2 sub state may be a low power link sub state.

Figure 5:
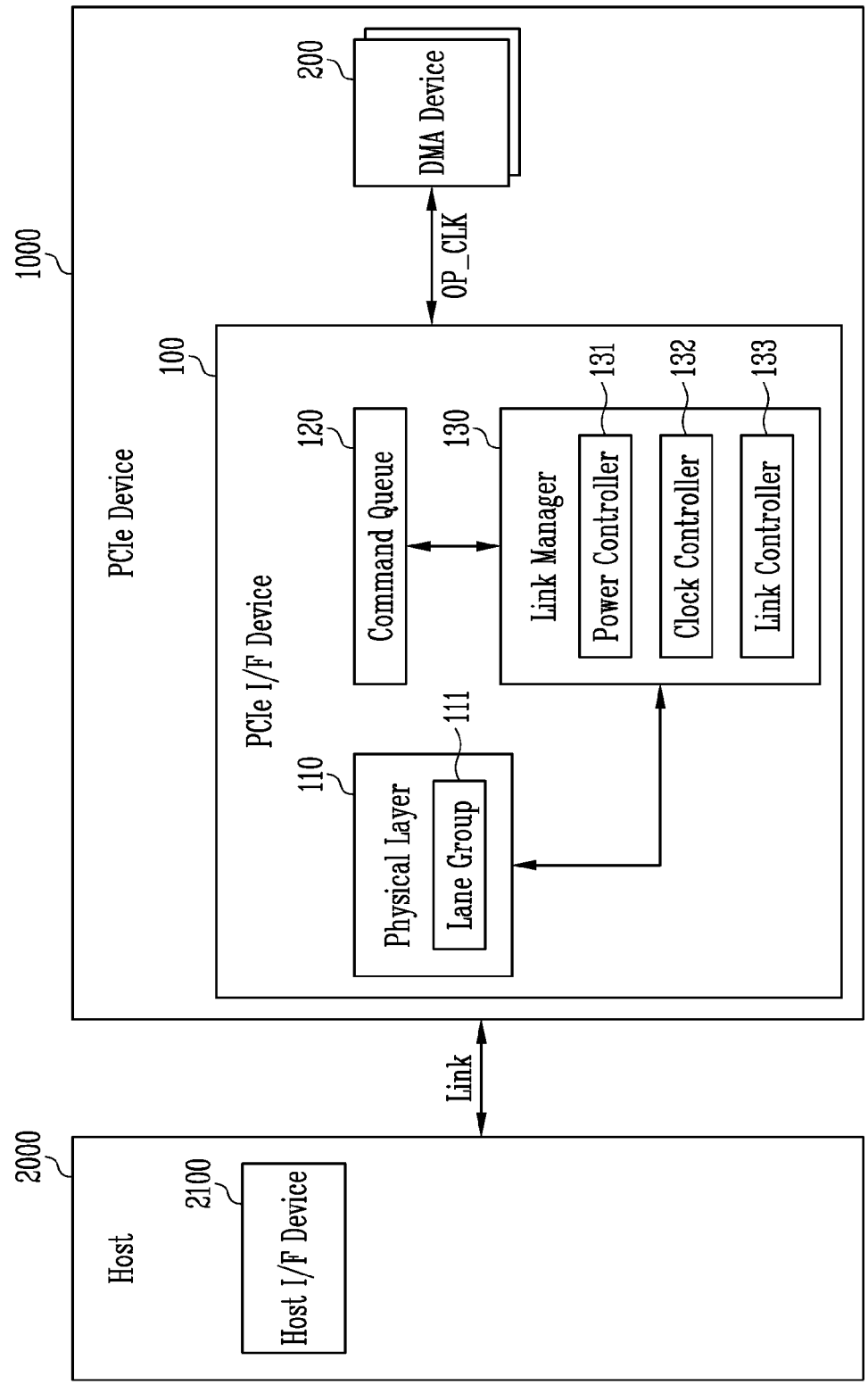
FIG. 5 is a diagram illustrating a structure of a PCIe device and communication with a host based on an embodiment of the disclosed technology.

FIG. 5 is a diagram illustrating a structure of a PCIe device and communication with a host based on an embodiment of the disclosed technology.

Referring to FIG. 5, the PCIe device 1000 may include a PCIe interface device 100 and at least one direct memory access (DMA) device 200.

The host 2000 may include a host interface device 2100.

The PCIe device 1000 and the host 2000 may communicate with each other using the PCIe interface device 100 and the host interface device 2100, respectively. The PCIe interface device 100 and the host interface device 2100 may form a link for communication. The link may include lanes connected between the PCIe interface device 100 and the host interface device 2100. The PCIe interface device 100 may transmit and receive data to and from the host interface device 2100 through the link. In an embodiment, the host 2000 may correspond to the first PCIe system 10 described with reference to FIG. 1. The PCIe device 1000 may correspond to the second PCIe system 20.

In an embodiment, the PCIe interface device 100 may include a physical layer 110, a command queue 120, and a link manager 130.

The physical layer 110 may form the link for communication with the host 2000. The physical layer 110 may include a lane group 111. The lane group 111 may include a default lane and at least one or more lanes.

The command queue 120 may store commands for at least one DMA device 200, which are generated based on a request of the host 2000.

When an amount of the commands stored in the command queue 120 is less than or equal to a reference value, the link manager 130 may change an operation mode from a first power mode to a second power mode. The second power mode may be a power mode in which power consumption is less than that of the first power mode among a plurality of power modes. In the second power mode, the link manager 130 may deactivate at least one or more lanes and provide a second operation clock lower than a first operation clock to the DMA device 200.

In an embodiment, the link manager 130 may include a power controller 131, a clock controller 132, and a link controller 133.

When the amount of the commands stored in the command queue is greater than the reference value, the power controller 131 may set the operation mode to the first power mode among the plurality of power modes. The plurality of power modes may include first to fifth power modes. The power consumption may be decreased in an order from the first power mode to the fifth power mode. Although the present embodiment has five power modes, the number of the plurality of power modes is not limited thereto and other implementations are also possible.

When the amount of the commands stored in the command queue is less than or equal to the reference value, the power controller 131 may set the operation mode to the second power mode. The power controller 131 may set the operation mode to the third power mode when the command queue is empty during a first time period that is equal to or more than a first reference time and a latency allowed by the host 2000 is less than or equal to a reference latency. The first reference time may be a reference time for determining whether to enter an active-idle period described with reference to FIG. 6. The power controller 131 may set the operation mode to the fourth power mode when the command queue is empty during the first time period that is equal to or more than the first reference time and the latency allowed by the host 2000 is greater than the reference latency. The power controller 131 may set the operation mode to the fifth power mode when the command queue is empty during a second time period that is equal to or more than a second reference time. The second reference time may be a reference time for determining whether to enter an idle period described with reference to FIG. 6. The second reference time may be greater than the first reference time.

The power controller 131 may set the default lane and at least one or more lanes to any one of a plurality of power states. The plurality of power states may include first to third power states. The power consumption may be increased in an order from the first power state to the third power state. The number of the plurality of power states is not limited to the present embodiment.

In the first power mode, the power controller 131 may set the default lane and at least one or more lanes to the third power state. In the second power mode, the power controller 131 may maintain the default lane as the third power state. In the second power mode, the power controller 131 may set at least one or more lanes to the first power state. In the third power mode, the power controller 131 may maintain the default lane as the third power state and set at least one or more lanes to a power off state. During the power off state, the power is not supplied and thus, the device is powered off. In the fourth power mode, the power controller 131 may set the default lane to the second power state and set at least one or more lanes to the power off state. In the fifth power mode, the power controller 131 may set the default lane to the first power state and set at least one or more lanes to the power off state.

In the first power mode, the clock controller 132 may provide the first operation clock to the DMA device 200. In the second to fourth power modes, the clock controller 132 may provide the second operation clock to the DMA device 200. The second operation clock may be an operation clock obtained by decreasing the first operation clock by a ratio of the number of activated lanes to a total number of lanes included in the lane group. Since the lane group includes the default lane and the at least one or more lanes, the total number of lanes corresponds to a sum of the number of the at least one or more lanes and one (i.e., the number of the default lane).

In the first to third power modes, the link controller 133 may maintain the link as the L0 state which is the normal link state. In the fourth power mode, the link controller 133 may transit the link to the L1 state which is the low power link state. In the fifth power mode, the link controller 133 may transit the link to a sub state of L1, which is the low power link sub state.

The DMA device 200 may perform data communication based on an operation clock OP_CLK provided from the PCIe device 1000.

A type of the DMA device 200 may include a non-volatile memory express (NVMe) device, a solid state drive (SSD) device, an artificial intelligence central processing unit (AI CPU), an artificial intelligence system on chip (AI SoC), Ethernet device, a sound card, a graphic card, and the like. The type of the DMA device 200 is not limited thereto, and may include other electronic devices using a PCIe communication protocol.

Figure 6:
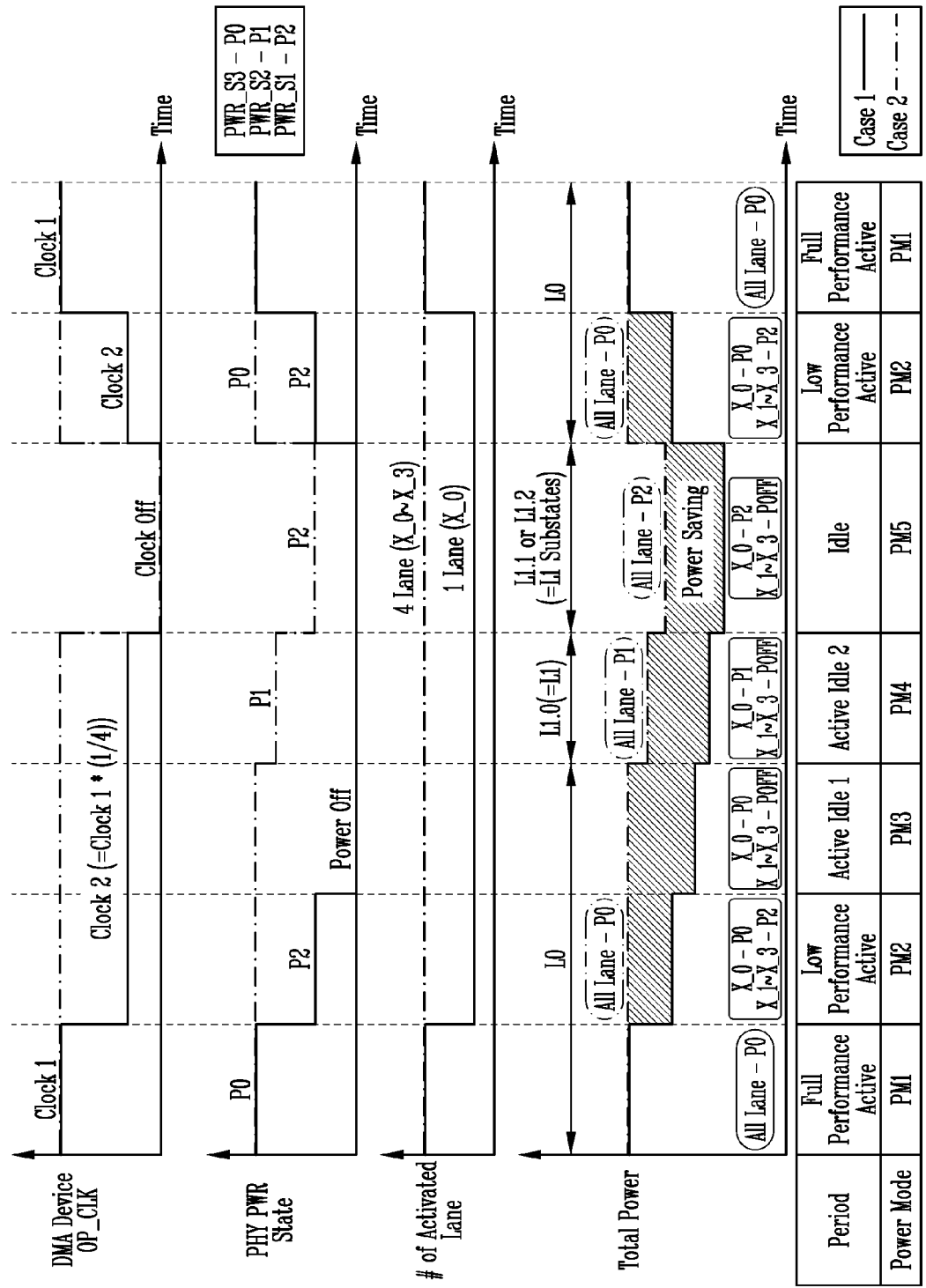
FIG. 6 is a diagram illustrating power management of a PCIe interface device described with reference to FIG. 5.

FIG. 6 is a diagram illustrating power management of the PCIe interface device described with reference to FIG. 5.

Referring to FIG. 6, the lane group may include first to fourth lanes X_0 to X_3. The number of lanes included in the lane group is not limited to the present embodiment and other implementations are also possible. The first lane X_0 may be the default lane.

In FIG. 6, the plurality of power modes may include first to fifth power modes PM1 to PM5. The number of the plurality of power modes is not limited to the present embodiment. The power consumption may be decreased in an order from the first power mode PM1 to the fifth power mode PM5.

In a full performance active period, the operation mode may be set to the first power mode PM1. In a low performance active period, the operation mode may be set to the second power mode PM2. In a first active idle period, the operation mode may be set to the third power mode PM3. In a second active idle period, the operation mode may be set to the fourth power mode PM4. In an idle period, the operation mode may be set to the fifth power mode PM5.

When the number of commands stored in the command queue is less than or equal to the reference value, the operation mode may be changed from the first power mode PM1 to the second power mode PM2. When a first reference time elapses from a time point when a process of all commands stored in the command queue is completed, the operation mode may be changed from the second power mode PM2 to the third power mode PM3. When the first reference time elapses from the time point when the process of all commands stored in the command queue is completed and the latency allowed by the host is greater than the reference latency, the operation mode may be changed from the third power mode PM3 to the fourth power mode PM4. When a second reference time elapses from the time point when the process of all commands stored in the command queue is completed, the operation mode may be changed from the fourth power mode PM4 to the fifth power mode PM5. The second reference time may be greater than the first reference time. When a new command is generated according to the request of the host, the operation mode may be changed from the fifth power mode PM5 to the second power mode PM2. When the number of generated new commands is greater than the reference value, the operation mode may be changed from the second power mode PM2 to the first power mode PM1.

The plurality of power states may include first to third power states PWR_S1 to PWR_S3. The number of the plurality of power states is not limited to the present embodiment. The power consumption may be increased in an order from the first power state PWR_S1 to the third power state PWR_S3. The first power state PWR_S1 may be a P2 state. The second power state PWR_S2 may be a P1 state. The third power state PWR_S3 may be a P0 state. In an embodiment, the power state may be set for each lane.

In the P0 state, the operation clock PCLK of the lane described with reference to FIG. 5 must stay operational. Internal clocks of the physical layer 110 except for the lane may be operational. The internal clocks of the physical layer 110 and the operation clock PCLK of the lane may be separate clocks. The physical layer 110 may transmit and receive PCI express signaling. The operation clock PCLK of the lane may vary according to Gen Speed of the PCIe device.

In the P1 state, a selected internal clock among the internal clocks of the physical layer 110 may be turned off. The operation clock PCLK of the lane must stay operational. Both of a transmit channel and a reception channel may be idle. The P1 state may be used in the disabled state, the detect state, and the L1 state described with reference to FIG. 4A.

In the P2 state, a selected internal clock among the internal clocks of the physical layer 110 may be turned off. The operation clock PCLK of the lane is turned off. A parallel interface may operate in an asynchronous mode. The P2 state may be used in the L1 state, the L2 state described with reference to FIG. 4A, and the sub state of L1 described with reference to FIG. 4B.

Regarding a first case, a first operation clock Clock 1 may be provided to the DMA device from the full performance active period to the low performance active period and the first active idle period. The first to fourth lanes X_0 to X_3 may be set to the P0 state. The link may maintain the L0 state.

In the second active idle period, the first operation clock Clock 1 may be provided to the DMA device. The first to fourth lanes X_0 to X_3 may be set to the P1 state. The link may transit to the L1 state.

In the idle period, the operation clock provided to the DMA device may be turned off. The first to fourth lanes X_0 to X_3 may be set to the P2 state. The link may transit to the sub state of L1.

Regarding a second case, in the full performance active period, the first operation clock Clock 1 may be provided to the DMA device. The first to fourth lanes X_0 to X_3 may be set to the P0 state. The link may maintain the L0 state.

In the low performance active period, a second operation clock Clock 2 may be provided to the DMA device. The second operation clock Clock 2 may be the operation clock obtained by decreasing the first operation clock Clock 1 by the ratio of the number of activated lanes to the total number of lanes included in the lane group. In FIG. 6, the second operation clock Clock 2 may be an operation clock obtained by decreasing the first operation clock Clock 1 to ¼. The first lane X_0 may be set to the P0 state. The second to fourth lanes X_1 to X_3 may be set to the P2 state. The link may maintain the L0 state.

In the first active idle period, the second operation clock Clock 2 may be provided to the DMA device. The first lane X_0 may be set to the P0 state. The second to fourth lanes X_1 to X_3 may be set to the power off state. The link may maintain the L0 state.

In the second active idle period, the second operation clock Clock 2 may be provided to the DMA device. The first lane X_0 may be set to the P1 state. The second to fourth lanes X_1 to X_3 may be set to the power off state. The link may transit to the L1 state.

In the idle period, the operation clock provided to the DMA device may be turned off. In various embodiments, a very low operation clock may be provided to the DMA device. The first lane X_0 may be set to the P2 state. The second to fourth lanes X_1 to X_3 may be set to the power off state. The link may transit to the sub state of L1.

From the low performance active period to the idle period, in the case of the first case, the first to fourth lanes X_0 to X_3 may be activated. In the case of the second case, only the first lane X_0, which is the default lane, may be activated, and the second to fourth lanes X_1 to X_3 may be deactivated. Therefore, the second case may reduce power consumption compared to the first case.

Figure 7B:
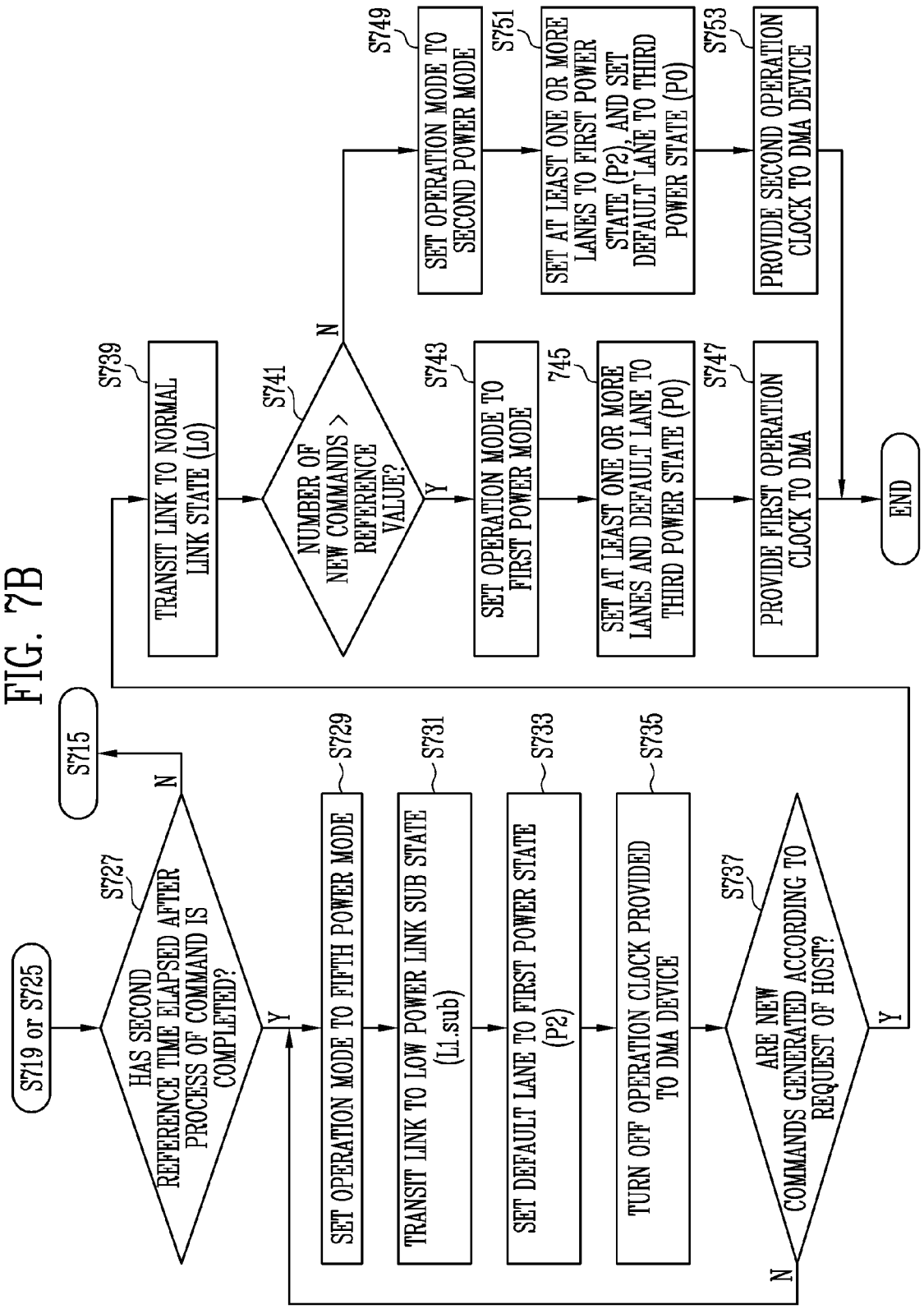

FIGS. 7A and 7B are flowcharts illustrating an operation of the PCIe interface device.

Referring to FIG. 7A, in step S701, the PCIe interface device may set the operation mode to the first power mode among the plurality of power modes. The first power mode may be a power mode having the highest power consumption among the plurality of power modes.

In step S703, the PCIe interface device may determine whether the number of commands for the DMA device is greater than the reference value. As a result of the determination, when the number of commands is greater than the reference value, the operation proceeds to step S701, and when the number of commands is less than or equal to the reference value, the operation proceeds to step S705.

In step S705, the PCIe interface device may set the operation mode to the second power mode in which the power consumption is less than that of the first power mode among the plurality of power modes.

In step S707, the PCIe interface device may deactivate at least one or more lanes except for the default lane among the plurality of lanes.

In step S709, the PCIe interface device may set at least one or more lanes to the first power state P2 among the plurality of power states, and set the default lane to the third power state P0 higher than the first power state P2. The third power state P0 may be the highest level among the plurality of power states.

In step S711, the PCIe interface device may provide the second operation clock lower than the first operation clock to the DMA device. The second operation clock may be the clock obtained by decreasing the first operation clock by the ratio of the number of activated lanes to the total number of lanes included in the lane group.

In step S713, the PCIe interface device may determine whether the first reference time elapses after the process of all commands for the DMA device described in step S703 is completed. The first reference time may be a reference time for determining whether to enter the active-idle period described with reference to FIG. 6.

In step S715, the PCIe interface device may determine whether the latency allowed by the host is greater than the reference latency. As a result of the determination, when the latency allowed by the host is greater than the reference latency, the operation proceeds to step S721, and when the latency allowed by the host is less than or equal to the reference latency, the operation proceeds to step S717.

In step S717, the PCIe interface device may set the operation mode to the third power mode in which the power consumption is less than that of the second power mode.

In step S719, the PCIe interface device may set at least one or more inactive lanes to the power off state.

In step S721, the PCIe interface device may set the operation mode to the fourth power mode in which the power consumption is less than that of the third power mode.

In step S723, the PCIe interface device may transit the link to the L1 state.

In step S725, the PCIe interface device may turn off power of at least one or more lanes, and set the power of the default lane to the second power state P1 higher than the first power state and lower than the third power state.

Referring to FIG. 7B, step S719 or step S725 may proceed to step S727.

In step S727, the PCIe interface device may determine whether the second reference time elapses after the process of all commands for the DMA device described above in step S703 is completed. The second reference time may be a reference time for determining whether to enter the idle period described with reference to FIG. 6. The second reference time may be greater than the first reference time.

In step S729, the PCIe interface device may set the operation mode to the fifth power mode. The fifth power mode may be a power mode having the lowest power consumption among the plurality of power modes.

In step S731, the PCIe interface device may transit the link to the low power link sub state. The low power link sub state may include the L1.1 sub state and the L1.2 sub state described with reference to FIG. 4B.

In step S733, the PCIe interface device may set the default lane to the first power state P2. The first power state P2 may be the lowest level among the plurality of power states.

In step S735, the PCIe interface device may turn off the operation clock provided to the DMA device.

In step S737, the PCIe interface device may determine whether the new commands for the DMA device are generated according to the request of the host. As a result of the determination, when the new commands are generated, the operation proceeds to step S739, and when the new commands are not generated, the operation proceeds to step S729.

In step S739, the PCIe interface device may transit the link to the normal link state L0.

In step S741, the PCIe interface device may determine whether the number of new commands generated in step S737 is greater than the reference value. As a result of the determination, when the number of new commands is greater than the reference value, the operation proceeds to step S743, and when the number of new commands is less than or equal to the reference value, the operation proceeds to step S749.

In step S743, the PCIe interface device may set the operation mode to the first power mode.

In step S745, the PCIe interface device may set at least one or more lanes and the default lane to the third power state P0.

In step S747, the PCIe interface device may provide the first operation clock to the DMA device.

In step S749, the PCIe interface device may set the operation mode to the second power mode.

In step S751, the PCIe interface device may set at least one or more lanes to the first power state P2 and set the default lane to the third power state P0.

In step S753, the PCIe interface device may provide the second operation clock to the DMA device.

While specific embodiments of the disclosed technology have been described above, various changes and modifications of the disclosed embodiments and other embodiments may be made based on what is described or illustrated in this patent document.

What is claimed is:

1. A device comprising:
   a lane group including a first lane and a second lane to provide communications, each lane being configured to form a link for communicating with a host;
   a command queue storing commands for at least one direct memory access (DMA) device, the commands generated based on a request of the host;
   a power controller configured to, in response to detecting an event that an amount of the commands stored in the command queue being less than or equal to a reference value, change an operation mode from a first power mode to a second power mode consuming less power than the first power mode, deactivate the second lane, and set the first lane to have a power state different from a power state of the second lane in the second power mode;
   a clock controller configured to provide, to the at least one DMA device, an operation clock in the second power mode, the operation clock having a frequency less than a frequency of an operation clock provided in the first power mode based on the number of activated lanes; and
   a link controller configured to maintain a state of the link as a normal link state in the second power mode.

2. The device of claim 1, wherein the power controller is configured to set, during the second power mode, the second lane to a first power state, and the first lane to a third power state in which power consumption is higher than the first power state.

3. The device of claim 2, wherein the power controller is configured to change the operation mode from the second power mode to a third power mode in which the power consumption is less than the second power mode, the change of the operation mode caused in response to the command queue being empty during a first time period equal to or more than a first reference time.

4. The device of claim 3, wherein the power controller is configured, during the third power mode, to maintain the first lane as the third power state and set the second lane to a power off state.

5. The device of claim 3, wherein the power controller is configured to change the operation mode from the third power mode to a fourth power mode in which the power consumption is less than the third power mode, the change of the operation mode caused in response to a latency allowed by the host being greater than a reference latency.

6. The device of claim 5, wherein the power controller is configured, during the fourth power mode, to set the first lane to a second power state in which the power consumption is higher than the first power state and lower than the third power state, and set the second lane to a power off state in which power is off.

7. The device of claim 5, wherein the link controller is configured to transit, in the fourth power mode, the link from the normal link state to a low power link state in which the power consumption is less than the normal link state.

8. The device of claim 3, wherein the power controller is configured to change the operation mode from the third power mode to a fifth power mode in which the power consumption is less than the third power mode, the change of the operation mode caused in response to the command queue being empty during a second time period greater than the first reference time.

9. The device of claim 8, wherein the power controller is configured, during the fifth power mode, to set the first lane to the first power state and set the second lane to a power off state in which power is off.

10. The device of claim 8, wherein the link controller is configured to transit, in the fifth power mode, the link from the normal link state to a low power link sub state in which the power consumption is less than that in the normal link state.

11. The device of claim 8, wherein the clock controller is configured to turn off the operation clock provided to the at least one DMA device in the fifth power mode.

12. The device of claim 8, wherein the power controller is configured to change the operation mode from the fifth power mode to the second power mode in response to a new command generated according to the request of the host and stored in the command queue, and
the link controller is configured to activate the second lane and transit the link from a low power link sub state to the normal link state in which the power consumption is greater than the low power link sub state.

13. The device of claim 12, wherein the power controller is configured to change the operation mode from the second power mode to the first power mode in response to the amount of the commands stored in the command queue being greater than the reference value.

14. A method of operating a peripheral component interconnect express (PCIe) interface device, the method comprising:
changing an operation mode from a first power mode to a second power mode in which power consumption is less than the first power mode in response to a first event that an amount of commands for at least one direct memory access (DMA) device generated based on a request of a host in communication with the PCIe interface device through a link is less than or equal to a reference value;
deactivating at least one or more lanes included in the PCIe interface device;
providing, to the at least one DMA device, an operation clock in the second power mode, the operation clock having a frequency less than a frequency of a operation clock provided in the first power mode based on the number of activated lanes; and
setting a default lane to have a power state different from a power state of the at least one or more lanes in the second power mode.

15. The method of claim 14, wherein changing to the second power mode comprises:
setting the at least one or more lanes to a first power state among a plurality of power states; and
setting the default lane separated from the at least one or more lanes and included in the PCIe interface device to a third power state in which the power consumption is higher than the first power state.

16. The method of claim 15, further comprising:
changing the operation mode from the second power mode to a third power mode in which the power consumption is less than the second power mode, in response to an elapse of a first reference time from a time point that a process of the commands for the at least one DMA device is completed.

17. The method of claim 16, wherein changing to the third power mode comprises:
controlling a state of the default lane to be in the third power state; and
setting the at least one or more lanes to be in a power off state in which power is off.

18. The method of claim 16, further comprising:
changing the operation mode from the third power mode to a fourth power mode in which the power consumption is less than the third power mode in response to a second event that a latency allowed by the host is greater than a reference latency.

19. The method of claim 18, wherein changing to the fourth power mode comprises:
setting the default lane to be in a second power state in which the power consumption is higher than the first power state and lower than the third power state;
setting the at least one or more lanes to be in a power off state in which power is off; and
transiting the link from a normal link state to a low power link state.

20. The method of claim 16, further comprising:
changing the operation mode from the third power mode to a fifth power mode in which the power consumption is less than the third power mode, in response to an elapse of a second reference time greater than the first reference time from the time point that the process of the commands is completed.

21. The method of claim 20, wherein changing to the fifth power mode comprises:
setting the default lane to the first power state;
setting the at least one or more lanes to a power off state in which power is off;
transiting the link from a normal link state to a low power link sub state; and
turning off the operation clock provided to the at least one DMA device in the fifth power mode.

22. The method of claim 21, further comprising:
changing the operation mode from the fifth power mode to the second power mode in response to new commands for the at least one DMA device being generated according to the request of the host;

activating the at least one or more lanes; and transiting the link from the low power link sub state to the normal link state.

23. The method of claim 22, further comprising:

changing the operation mode from the second power mode to the first power mode in response to a third event that the number of the new commands is greater than the reference value.

24. The device of claim 1, wherein the operation clock in the second power mode is obtained by multiplying the operation clock provided in the first power mode by a ratio of the number of activated lanes to a total number of lanes included in the lane group.

25. The method of claim 14, wherein the operation clock in the second power mode is obtained by multiplying the operation clock provided in the first power mode by a ratio of the number of activated lanes to a total number of lanes included in the lane group.

* * * * *